Fuchs et al.

[11] 3,747,739
[45] July 24, 1973

[54] APPARATUS ON A PACKING MACHINE FOR FEEDING AND SEPARATING ARTICLES FOR PACKING

[75] Inventors: Werner Fuchs, Crissier; Ulrich Kramer, Pully, both of Switzerland

[73] Assignee: Sapal Societe anonyme des plieuses automatiques, Vaud, Switzerland

[22] Filed: Oct. 18, 1971

[21] Appl. No.: 190,075

[30] Foreign Application Priority Data
Nov. 5, 1970 Switzerland.................. 16414/70

[52] U.S. Cl. .............................................. 198/34
[51] Int. Cl. .......................................... B65g 47/26
[58] Field of Search................... 198/34, 166, 76

[56] References Cited
UNITED STATES PATENTS
3,572,495  3/1971  Luginbuhl........................ 198/34
3,382,974  5/1968  Mayeux........................... 198/34 X
3,333,676  8/1967  Sherman.......................... 198/34

*Primary Examiner*—Harvey C. Hornsby
*Assistant Examiner*—James W. Miller
*Attorney*—Richard K. Stevens, Davidson C. Miller et al.

[57] ABSTRACT

Apparatus on a packing machine for feeding and separating articles for packing, comprising an endless belt for feeding a closed column of articles, means at the end of the feed belt for positioning and releasing articles, and separating means disposed parallel to the first means for separating the articles individually or in groups in the direction of movement of the belt, and passing the same separately to discharge means, said movable means for positioning and releasing the articles periodically moving at substantially the same speed and in the same direction as the feed belt and the articles thereon, and said separating means being so constructed that they laterally engage an individual article or a group of articles towards the end of the fed belt at the same speed as the movable means for positioning the articles, accelerate the same, and transfer them to the discharge means at a speed greater than that of the feed belt, without the continuous flow of articles being interrupted.

2 Claims, 2 Drawing Figures

APPARATUS ON A PACKING MACHINE FOR FEEDING AND SEPARATING ARTICLES FOR PACKING

The invention relates to an apparatus on a packing machine for feeding and separating articles for packing, comprising an endless belt for feeding a closed column of articles, means at the end of the feed belt for positioning and releasing articles, and separating means disposed parallel to the first means for separating the articles individually or in groups in the direction of movement of the belt, and passing the same separately to discharge means.

Apparatus of this type is already known. In one known type, the column of products is advanced intermittently. Whenever one or more articles are separated from the others, the column stops. The outputs of such devices are limited as a result of the intermittent operation.

Systems of this kind are also known in which the column of products is advanced continuously. During separation, however, the ends of the products rub against one another. This has been found to damage certain articles.

The object of the invention is to provide an apparatus which obviates the said disadvantages.

The apparatus according to the invention is characterised in that the movable means for positioning and releasing the articles periodically move at substantially the same speed and in the same direction as the feed belt and the articles thereon, and the separating means are so constructed that they laterally engage an individual article or a group of articles towards the end of the feed belt at the same speed as the movable means for positioning the articles, accelerate the same, and transfer them to the discharge means at a speed greater than that of the feed belt, without the continuous flow of articles being interrupted.

Two embodiments of the apparatus will be explained in detail herein-below with reference to the accompanying drawing.

The speeds V are defined as follows:

$V_1$ = theoretical speed determined by the packing capacity and length of the articles.

$V_2$ = somewhat less than $V_1$, e.g. 2 to 20 percent less.

$V_3$ = somewhat greater than $V_1$, e.g. 2 to 20 percent greater.

$V_4$ = speed determined by packing capacity and separation of discharge means.

$V_5$ = somewhat less than $V_1$, e.g. 2 to 20 percent less.

$V_6$ = somewhat greater than $V_1$, e.g. 2 to 20 percent greater.

Figure 1:
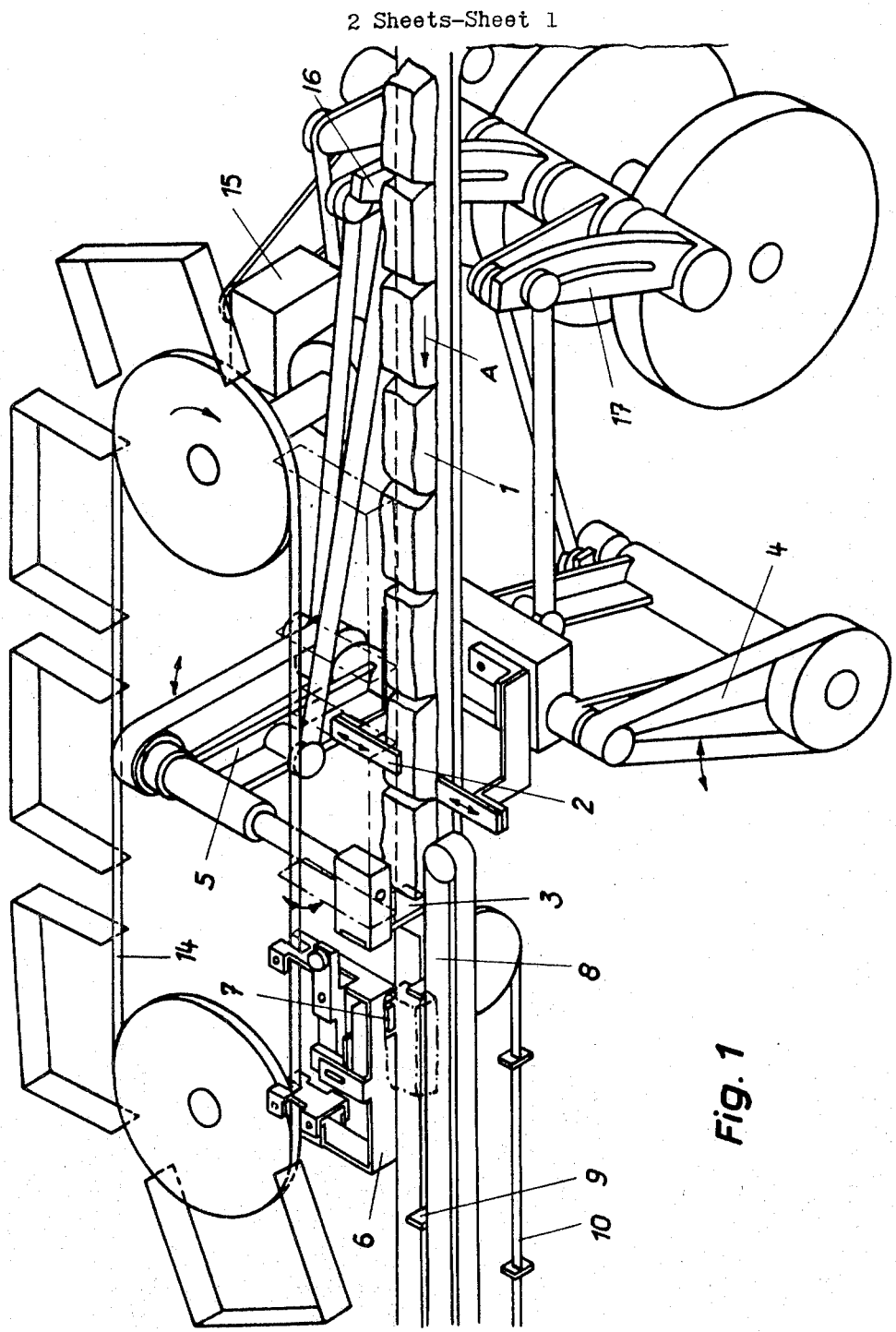
FIG. 1 is a perspective view of a simplified diagram of a first embodiment.

The apparatus illustrated in FIG. 1 comprises an endless belt 1 on which articles for packing are conveyed in the direction of the arrow A towards a pair of punches 2 and a stop 3. The pair of punches 2 is disposed on a reciprocating lever 4, while the stop 3 is disposed on a reciprocating lever 5.

Stations 6 are disposed on a rotating chain 14 and are all provided with a punch 7. FIG. 1 shows only one of the stations 6 in detail, the others simply being indicated diagrammatically. The station 6 shown in detail is situated opposite a toothed belt 8. The chain 14 and the belt 8 are driven at the same speeds by differential gear 15. The average speed of this gear remains constant for a given output for all article sizes.

A chain 10 bearing lugs 9 runs in the same direction as the belt 1 towards a stop (not shown), from which the articles can be fed in known manner to a packing machine.

A control system 16 is provided for the drive for the lever 5 and a control system 17 for the drive for the lever 4.

The apparatus illustrated operates as follows:

The main drive for the feed system is provided by a chain transmission (not shown) to the packing machine. The feed belt 1 is driven by an individual motor (not shown). A known logic system controlled by two photoelectric cells provides a constant length (within a certain tolerance) of closed articles after the stop 3. If this length falls short of the minimum column length, the packing machine and hence also the main drive for the feed system is automatically disconnected. The further supply of new articles is continued by means of the feed belt 1 which still runs at the speed $V_3$.

If there is no column of products, the stop 3 must be closed and the pair of punches 2 must be opened during the filling operation. As soon as the closed column reaches the minimum length, the packing machine and hence also the feed system start.

The closed column of products is positioned by means of the stop 3 advancing at the speed $V_2$. During this operation, the column assumes the speed $V_2$. While the stop 3 is concluding its advance movement, the last of the products to be separated is clamped between the punch 7 of the chain station 6 and the toothed belt 8. At that time, the speed of these two elements is $V_2$. When the last of the products to be separated is clamped, the product situated after this last product in the direction of advance is clamped between two closing punches 2. The speed of advance of the punches 2 is also $V_2$.

When the clamping operation has ended, the stop 3 opens and returns to its initial position. The products clamped between the chain station 6 and the toothed belt 8 are accelerated by these two elements, brought to the exit speed $V_4$, and released. During the separation operation, the conveyor finger 9 of the exit chain 10 is introduced into the space formed between the products. The conveyor finger 9 pushes the released products on at the exit speed $V_4$.

During the acceleration operation, the stop 3 which has returned to its starting position re-closes and the two punches open and return to their initial positions. The released articles then overtake the stop 3 advancing at the speed $V_2$, this effect being achieved by means of the belt 1 which is driven at the speed $V_3$. The cycle re-starts.

Some packing machines do not enable the articles to be introduced in the longitudinal direction. For such machines, a known chain (not shown) is provided at the end of the feed line and feeds the articles laterally to the packing machine. The articles are pushed in the longitudinal direction by the conveyor feeder 9 against a stop (not shown). Just before the articles touch this stop, the conveyor finger 9 swings out and the articles are fed to the packing machine by means of a known pallet.

Figure 2:
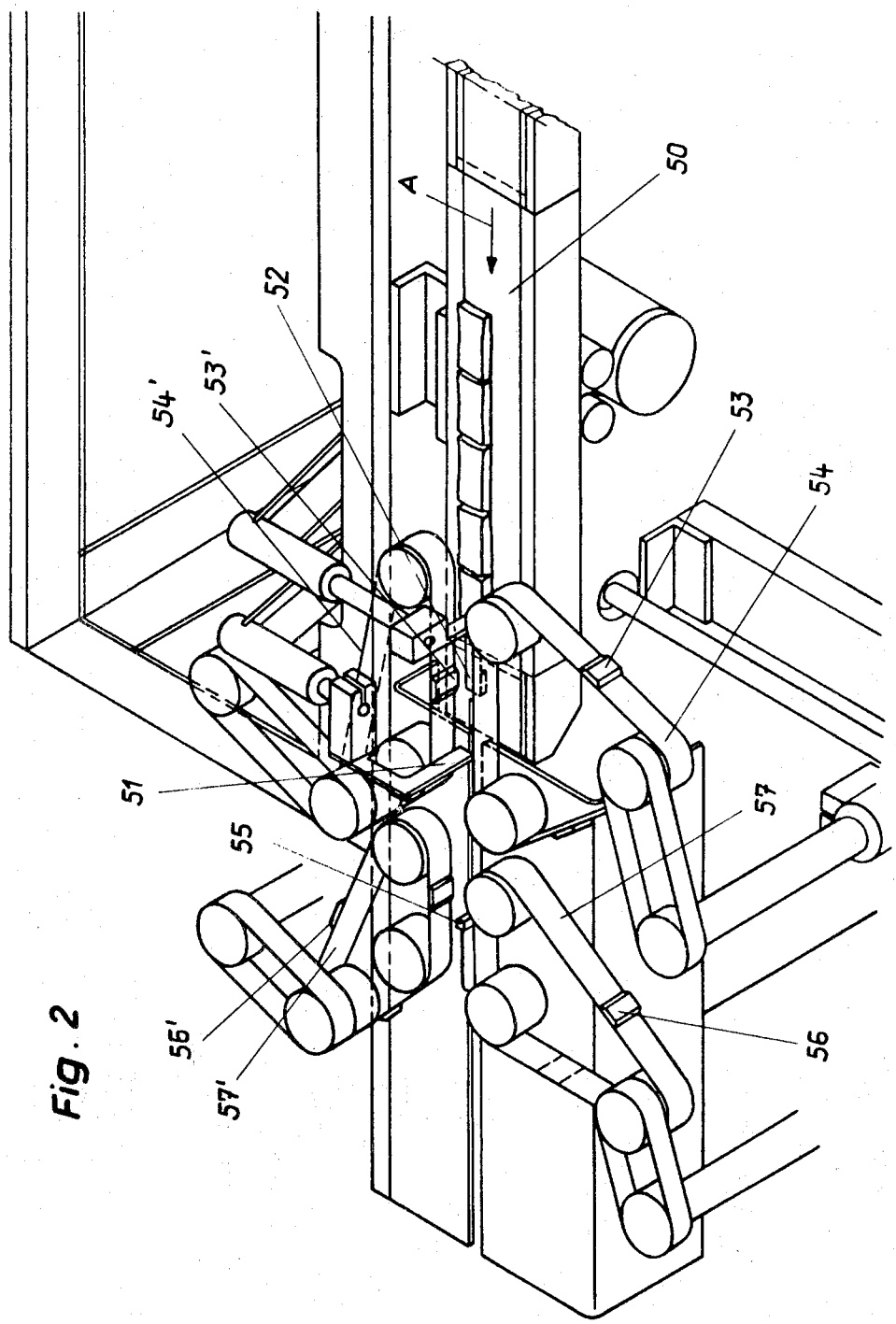
FIG. 2 is a perspective view of a simplified diagram of a second embodiment.

The apparatus shown in FIG. 2 comprises an endless belt 50 for the articles moving in the direction of the arrow A, a movable stop 51 and a punch 52. A toothed belt 54, 54' with lugs 53, 53' is disposed at the end of and on each side of the belt 50.

A chain corresponding to the chain 10 is provided with conveyor lugs 55 which run in the same direction as the belt 50. On either side of the chain bearing the lugs 55, toothed belts 57, 57' bearing lugs 56, 56' are provided after each of the belts 54.

This apparatus operates as follows:

The main drive is provided by a stable connection to the packing machine. A known logic system controlled by two photoelectric cells produces a constant length (within a certain tolerance) of a column of articles after the entry belt 50. If the length falls short of the minimum column length, the packing machine is automatically disconnected. The further supply of fresh articles is continued by the feed belt which still runs.

If there is no column of articles on the belt 50 when the machine is stationary, the belt is filled manually. In these conditions the stop 51 must be closed and the punch 52 opened.

When the machine is started, the stop 51 advancing at the speed $V_5$ positions the column of articles. During this operation, the column advancing at the speed $V_6$ assumes the speed $V_5$. While the stop 51 is completing its advance movement, the last article to be separated is clamped between two lugs 53 disposed on the toothed belt 54. The speed of the lugs 53 is $V_5$ at that time. When the last of the articles to be separated is clamped, the article following it is clamped between the punch 52 and the entry belt 50. The speed of advance of the punch 52 and of the belt 50 is $V_6$. During the clamping operation, the stop 51 opens and returns to its initial position. The articles clamped between the lugs 53 on the toothed belt 54 are accelerated and released in accordance with a given law. During the separating operation, the conveyor lug 55 pushes into the space created between the separated articles. The lug 55 pushes the released articles on with uniform spacing and at a constant speed.

During the acceleration operation, the stop 51 which is returned to its starting position re-closes; the punch 52 opens and returns to its initial position. The released articles then overtake the stop 51 advancing at the speed $V_5$, this effect being obtained by means of the belt 50 driven at the speed $V_6$. The cycle re-starts.

The separating operation described can be carried out for one or more articles. Groups of articles advancing with uniform spacing can be separated by further separating operations. Additional separating stations can be added depending upon the number of subsequent separations required. FIG. 2 shows a station of this type has been added. The articles or groups of articles which have just been released by the lugs 53 are taken over by the lugs 56 and accelerated in accordance with a given law. The group of articles is separated before the part of the group bringing up the rear has been released by the lugs 53. As soon as there is enough space between the separated group an additional lug 55 is introduced between the articles. The latter are then fed to the packing machine with uniform spacing and at a constant speed $V_4$. The advantage of this arrangement is that the separating capacity of the complete apparatus can be greatly increased. This means that the articles to be separated can be fed to the apparatus more rapidly and yet perfect separation can be obtained.

We claim:

1. Apparatus on a packing machine for feeding and separating articles for packing, comprising an endless belt for feeding a closed column of articles, a movable stop and punch at the end of the feed belt for positioning and releasing articles, and separating means disposed parallel to the stop and punch for separating the articles individually or in groups in the direction of movement of the belt, and passing the same separately to discharge means, said movable stop and punch for positioning and releasing the articles periodically moving at substantially the same speed and in the same direction as the feed belt and the articles thereon, the separating means comprising an endless belt for laterally supporting the articles, said belt being disposed vertically and running in the horizontal direction, and horizontal punches for pressing the articles against the vertical belt, said punches moving in the horizontal direction at the same periodically varying speed as the said belt and being movable towards one side of the articles, and said separating means being further so constructed that they laterally engage an individual article or a group of articles towards the end of the feed belt at the same speed as the movable stop and punch for positioning the articles, accelerate the same, and transfer them to the discharge means at a speed greater than that of the feed belt, without the continuous flow of articles being interrupted, means being provided for synchronous actuation of the positioning stop and the punches and the horizontal punches, and a horizontal endless toothed chain or a horizontal endless belt being provided which move at a greater speed than that of the feed belt and synchronously take up and advance the separated articles towards said discharge means.

2. Apparatus on a packing machine for feeding and separating articles for packing, comprising an endless belt for feeding a closed column of articles, a movable stop and punch at the end of the feed belt for positioning and releasing articles, and separating means disposed parallel to the stop and punch for separating the articles individually or in groups in the direction of movement of the belt, and passing the same separately to discharge means, said movable stop and belt for positioning and releasing the articles periodically moving at substantially the same speed and in the same direction as the feed belt and the articles thereon, the separating means comprising horizontally running endless belts which are disposed vertically on both sides of the stream of articles and which move at a greater speed than that of the feed belt, and means which periodically push against the articles at least those vertical belts which are disposed on one side of the stream, in order to hold and accelerate said articles, and said separating means being so constructed that they laterally engage an individual article or a group of articles towards the end of the feed belt at the same speed as the movable stop and punch for positioning the articles, accelerate the same, and transfer them to the discharge means at a speed greater than that of the feed belt, without the continuous flow of articles being interrupted, means being provided for synchronous actuation of the positioning stop and the punches and the vertical belts, and a horizontal endless toothed chain or a horizontal endless belt being provided which move at a greater speed than that of the feed belt and synchronously take up and advance the separated articles towards said discharge means.

* * * * *